Aug. 24, 1926.

Re. 16,405

A. R. THOMPSON

ROTARY EXHAUST BOX

Original Filed Feb. 20, 1922 4 Sheets-Sheet 1

INVENTOR.
Albert R. Thompson
BY
Carlos P. Griffin
ATTORNEY.

Aug. 24, 1926.

Re. 16,405

A. R. THOMPSON

ROTARY EXHAUST BOX

Original Filed Feb. 20, 1922 4 Sheets-Sheet 2

INVENTOR.
Albert R. Thompson
BY
Carlos P. Griffin
ATTORNEY.

Aug. 24, 1926. Re. 16,405

A. R. THOMPSON

ROTARY EXHAUST BOX

Original Filed Feb. 20, 1922 4 Sheets-Sheet 3

INVENTOR.
Albert R. Thompson
BY
Carlos P. Griffin
ATTORNEY.

Aug. 24, 1926. Re. 16,405

A. R. THOMPSON

ROTARY EXHAUST BOX

Original Filed Feb. 20, 1922 4 Sheets-Sheet 4

INVENTOR.
Albert R. Thompson
BY
Carlos P. Griffin
ATTORNEY.

Patented Aug. 24, 1926. Re. 16,405

UNITED STATES PATENT OFFICE.

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

ROTARY EXHAUST BOX.

Original application filed February 20, 1922, Serial No. 537,862. Renewed December 20, 1924. Original No. 1,526,794, dated February 17, 1925. Application for reissue filed June 29, 1926. Serial No. 119,487.

My invention relates to heat-treating devices used in the canning art, and especially to exhaust boxes in which the filled cans, while still open are subjected to what is commonly called the "first cook" whereby the air in greater part is driven out, prior to the sealing of the cans and the final cook.

The object of my invention is to provide a simple, effective, capacious and continuously operating machine or apparatus of this nature, and to this end my invention consists in the novel exhaust-box which I shall now fully describe by reference to the accompanying drawings, it being understood, however, that my said invention is not confined to an exhaust-box proper, as it may be used as a cooker for the final cook, or for heat treating canned goods for any purpose; and it being also understood that changes in the device and its details of construction and arrangement may be made without departing from the spirit or scope of the invention as defined by the claims hereunto appended.

Another object of the invention is to provide means for removing the cans from the carriers at a place at which their vertical motion is a minimum, and at a point at which the operating mechanism is clear of the top of the cans, thus permitting a free movement thereof without interference, and at the same time reducing the necessity for absolutely accurate timing, whereby there is less danger of the cans being improperly removed from, or supplied to the carriers, and also reducing the likelihood of jams on the carriers as will be apparent from an examination of the several mechanical operations.

In the drawings—

Figure 1:
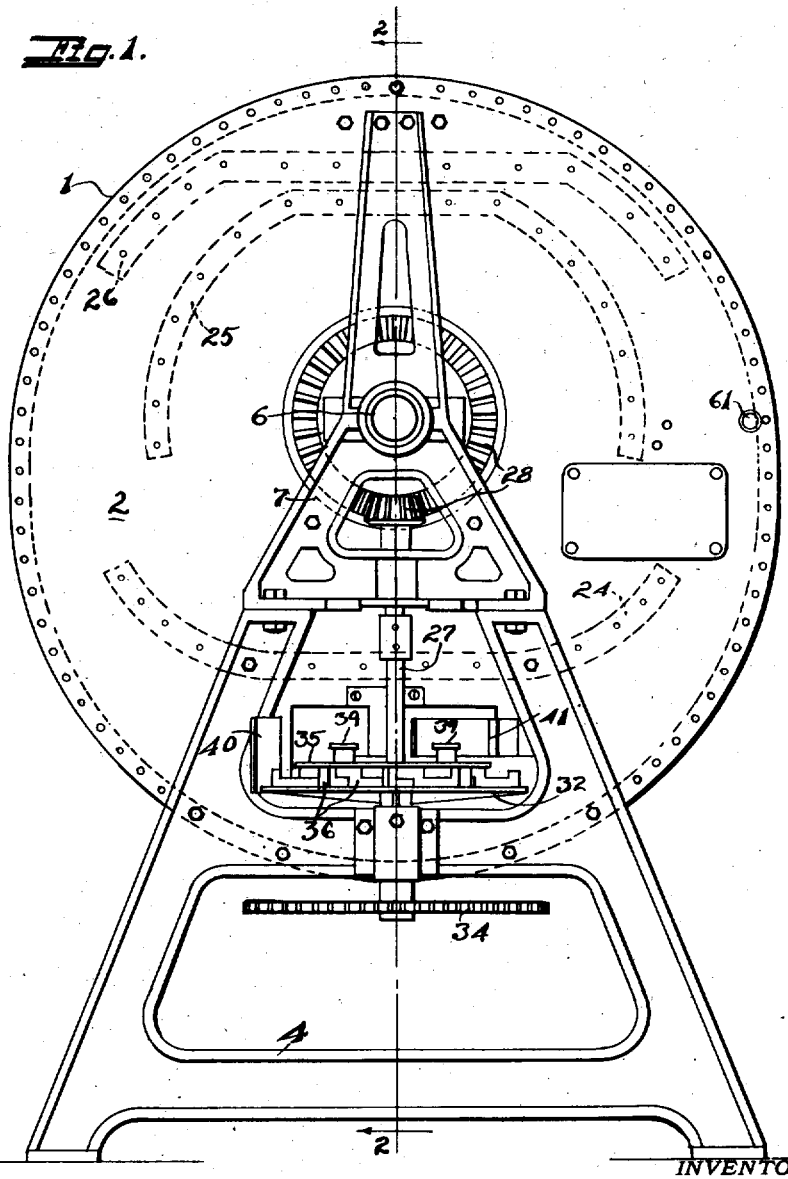
Figure 1 is an end elevation of my exhaust-box.
Figure 2:
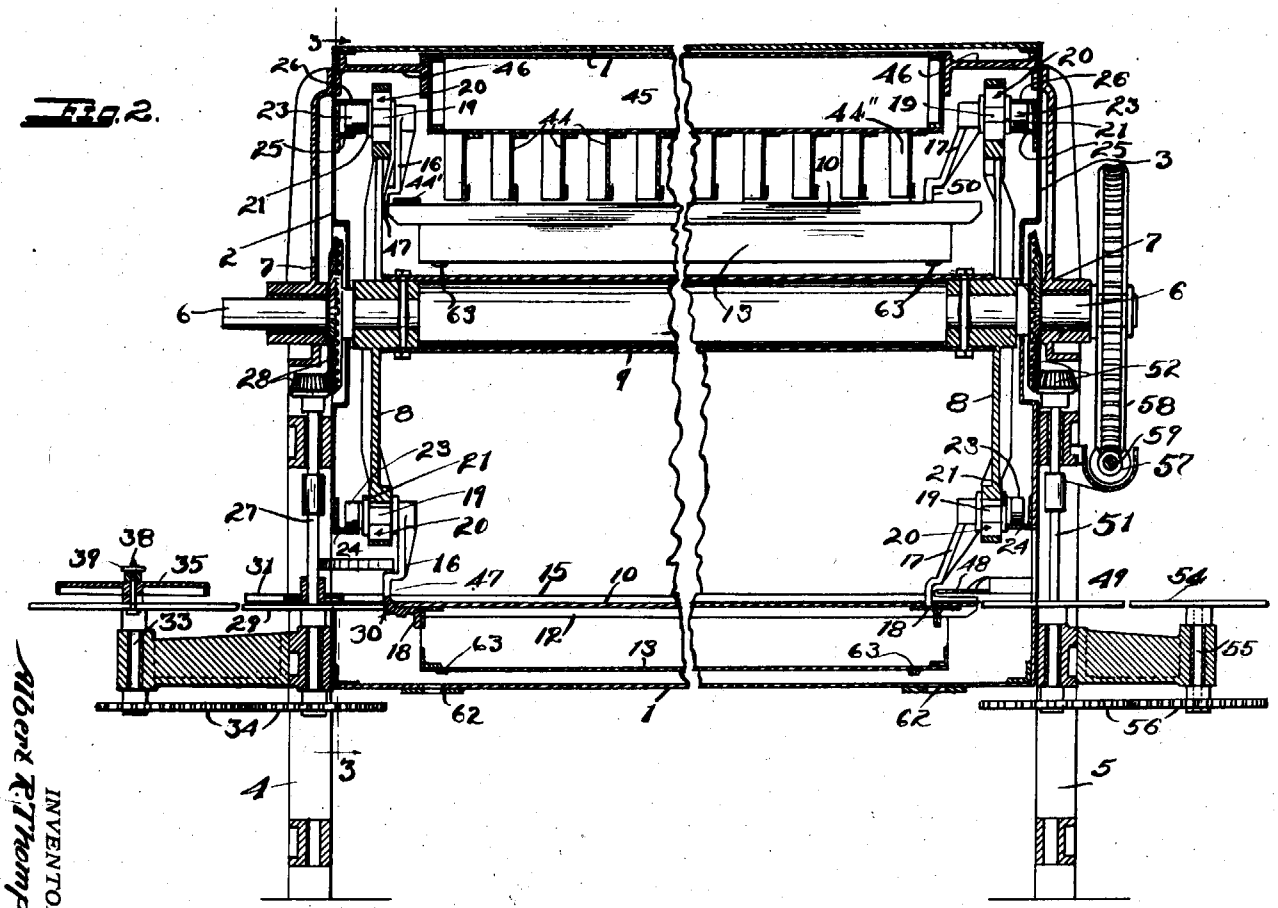
Figure 2 is a longitudinal section taken on the line 2—2 of Figure 1, and viewed in the direction of the arrow, one of the gears 34 being broken away for purposes of illustration.
Figure 3:
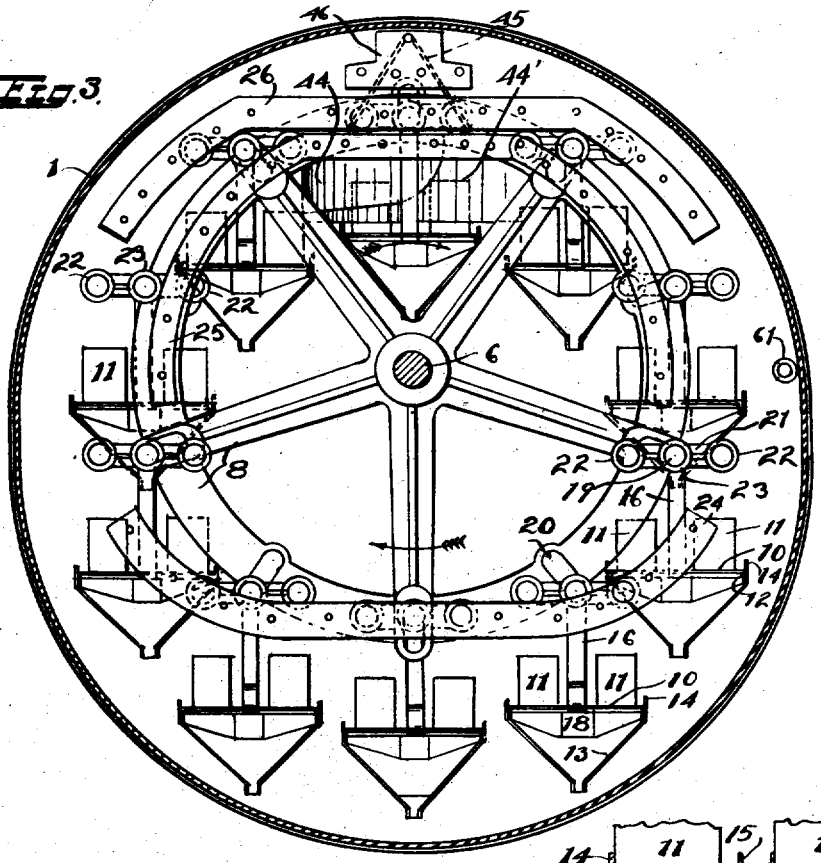
Figure 3 is a transverse section taken on the line 3—3 of Figure 2 and viewed in the direction of the arrow.

In the drawings, and referring particularly in Figures 1 and 2 thereof, the reference numeral 1 designates a cylindrical shell, which is closed at its ends by plates 2 and 3, to which are secured legs 4 and 5 respectively for supporting the entire machine. A shaft 6 extends through said shell, and is mounted above the center thereof, in bearing standards 7 rising from the legs 4 and 5. A pair of spiders 8, Figures 2 and 3, are fixed upon said shaft within the shell, one near each end. That portion of said shaft extending between said spiders 8 consists of a tubular member, as shown at 9 in Figure 2, to secure the necessary rigidity without excessive weight.

The spiders 8 carry a series of pivotally supported pendulous shelves 10, Figures 2 and 3, extending the entire distance between said spiders. In the drawings I have shown ten such shelves, but the number thereof depends solely on structural considerations. They are spaced equi-distant about the spiders 8, and are all similar, so that a description of one will suffice for all.

Figure 4:
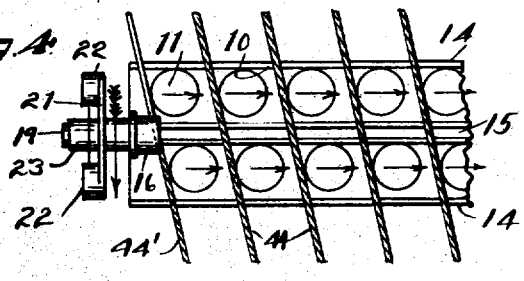
Figure 4 is a detailed sectional plan showing a portion of one can shelf and the means for advancing the cans longitudinally along the same.
Figure 5:
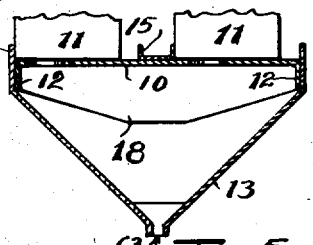
Figure 5 is a transverse section, enlarged, of one of the can shelves.

The shelf itself is a flat plate wide enough to carry two rows of cans 11, as shown in Figures 3, 4 and 5, and having its side edges turned downwardly as at 12, in Figures 3 and 5, to add stiffness. Further reinforcement is obtained by a longitudinally bent lower plate 13 of V-shaped section, secured to the flanges 12 of the shelf, and projecting slightly above said shelf to form side rims 14 to act as guides or retainers for the cans 11. The shelf 10 and its reinforcement 13 thus form a triangular box-like structure open at both ends, of extreme rigidity and lightness. Moreover, it is still further reinforced by an upturned channel-section bar 15, secured to the upper surface of the shelf 10 and running the entire length thereof in its median line. Said channel bar 15 also acts as a central guide between the two rows of cans 11.

The shelf structure thus formed is supported by hangers 16 and 17, Figure 2, the former being positioned at the feed end and the latter at the discharge end. The hanger 16 is secured to the extreme end of the shelf 10, and the hanger 17 a slight distance back, as shown, to enable the proper feeding and discharging of the cans to and from said shelf. Both hangers have laterally extended outer ends 18 which lie beneath the shelf 10 for its entire width.

Figure 9:
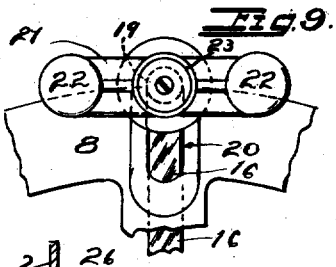
Figure 9 is a detailed end elevation, enlarged, of a portion of the shelf-supporting hangers and a portion of the carrying spider therefor.
Figure 10:
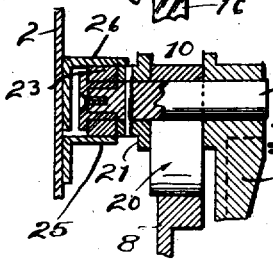
Figure 10 is a section taken on the line 10—10 of Figure 9.

The hangers 16 and 17 are fixed upon the inner ends of studs 19, Figures 2, 4 and 10, which pass outwardly, freely, through radially disposed slots 20 formed in the spiders 8. The outer ends of said studs 19 have secured to them, horizontal cross arms 21, Figures 4 and 9 terminating in knobs 22.

A roller 23 is rotatably mounted upon the end of each stud 19 beyond the arms 21, said roller projecting outwardly farther than the knobs 22, as shown in Figure 4.

It will be seen that the shelves 10 suspended from the studs 19 are maintained at all times in a horizontal plane by their own weight, and would travel in a true circular path within the shell 1 if their studs 19 were not mounted in the radial slots 20. It is necessary, however, for the purposes of feeding, discharging and advancing the cans 11 upon said shelves, to prevent them from swinging freely, and also to cause them to depart from their normal circular path and to travel in horizontal paths, at two portions in their revolution within the shell, such portions being at the lowermost and uppermost limits of their travel. This result is accomplished by fixed guide rails, secured to the inner surfaces of the ends 2 and 3 of the shell, and acting on the rollers 23 and knobs 22 of the shelf hangers.

The guide rails are similar at both ends of the shell, and are preferably formed of angle iron. One of said rails, as shown at 24, in Figures 1, 2 and 3, is positioned below the center of the end, and has upwardly inclined curved end portions and a horizontal central portion. When the revolution of the spiders 8 carries any given shelf 10 toward its lowermost position, the curved end of the guide rail 24 first engages the outer knob 22 associated with that shelf, as shown in Figure 9, thereby preventing any free swinging action on the part of said shelf. Shortly thereafter the roller 23 and both knobs 22 are engaged by and travel along the horizontal portion of said guide rail 24, thus supporting the entire weight of said shelf and causing it to travel in a horizontal path, the stud 19 riding up in the slot 20. The reverse action takes place when the end of the horizontal rail portion is reached, the weight of the shelf being transferred back to the studs 19, which are again at the outer ends of the slots 20.

When the shelf reaches the approximate mid-point of its upward travel, the roller 23 begins to ride upon the upper surface of a guide rail 25, Figures 1, 2 and 3, whose end portions are curved upon an arc concentric with the shaft 6, and whose central portion is straight and horizontal. This guide rail 25 is of sufficient width to engage only the roller 23, and not the knobs 22, as shown in Figures 2 and 10. The curved portion of said guide rail, gradually receives the weight of the shelf, and its straight portion causes said shelf to travel in a horizontal path when crossing the upper center as will be seen from Figure 3. The reverse takes place on the downward movement of said shelf, its weight being gradually transferred back to the spiders 8.

There is also a second upper guide rail 26, Figures 1, 2 and 3, positioned above the rail 25, and having curved end portions and a straight horizontal center portion. This rail 26 is wider than the rail 25, and engages the knobs 22 as well as the roller 23. As shown in Figure 3, the curved portion of said rail 26 first engages the outer knob 22, to dampen any swinging of the shelf, and shortly thereafter its horizontal central portion engages both knobs 22, and the roller 23 as well, thereby holding the shelf from any swinging whatever during its horizontal travel.

Figure 6:
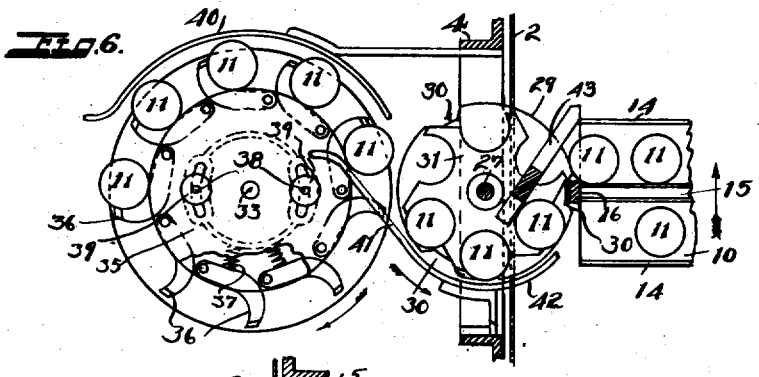
Figure 6 is a detailed plan view of the can feed mechanism.

The cans are fed onto the shelves 10 at the left-hand end of the machine as viewed in Figure 2, when said shelves are at their lowermost position. A vertical shaft 27 is journaled in the supporting leg 4, and is driven by bevel gears 28 from the main shaft 6. Said vertical shaft has fixed upon it a disk 29, in the same horizontal plane as the shelf 10 when the latter is travelling in its lower horizontal path. The ends of the shelves pass in close proximity to the periphery of said disk, the latter having notches 30, Figures 2 and 6, to clear the shelf hangers 16. Immediately above the disk 29 is a pocket-wheel 31, also fixed upon the vertical shaft 27.

A second rotating horizontal disk 32 is positioned to the left of the disk 29, and in the plane thereof, and is driven by a short vertical shaft 33 and spur gears 34 from the shaft 27. Spaced above the disk 32 is a plate 35, Figures 1 and 6, upon whose under surface are mounted a series of regularly spaced curved pivoted fingers 36, which are held in their outer or operative positions by springs 37. The plate 35 is removably secured to the underlying disk 32 by studs 38 and nuts 39, so that, by unscrewing said nuts, said plate and its fingers 36 can be lifted off for cleaning or repair.

The cans 11 are fed onto the disk 32 by any means not shown in the drawings, and are spaced thereupon by the fingers 36. If a can should be misplaced upon said disk, one of the fingers 36 swings inwardly, against the action of its spring 37, to prevent injury to said can. The next finger following would then engage said can and carry it along in its proper position. The disk 32, rotating in the direction of the arrow in Figure 6, carries the cans around, guided by a curved stationary guide 40, and delivers them to the disk 29, the transfer being effected by a stationary stripper 41 and the pocket wheel 31. Said cans are then carried into the shell of the exhaust-box by said disk 29, each can lying within one of the pockets of said wheel 31, and retained therein by a curved guide 42. A stationary stripper 43 finally transfers the cans, successively, from said disk 29 to the ends of the shelves 10.

The shelves 10, as stated above, are wide enough to carry two rows of cans, and the transverse distance between the two adjacent can tracks of two adjacent shelves, when travelling in the horizontal portion of their path, is the same as the distance between the two can tracks of the same shelf, so that the can tracks of said shelves pass the feed disk 29 at regular intervals, and said disk is so timed as to supply a can to the end of each track, thus placing two cans on each shelf. The two cans thus placed upon the end of any given shelf are then carried thereby to the upper portion of the shell, where they are shifted longitudinally along said shelf to make room for two more cans to be placed upon the end of said shelf when it again passes the feed mechanism. This shifting of the cans upon the shelf is repeated at each revolution, and is accomplished by a series of regularly spaced, vertically disposed, and horizontally inclined plates 44, Figures 2, 3 and 4, secured to and extending downwardly from a supporting beam 45 positioned at the highest point in the shell 1. The beam 45 is formed, for the sake of strength and rigidity, as a hollow triangular body, with its lower side horizontal, to which the can shifting plates 44 are secured. Said beam is supported by brackets 46 extending from its ends to the ends of said shell, and there secured to upward extensions of the end bracket members 7.

The can shifting plates 44 are angularly disposed, as shown, and are so proportioned and mounted as to advance each can along its shelf-track, a distance equal to or slightly greater than its own width. The first plate 44′, Figures 2, 3 and 4 at the left-hand end as viewed in Figure 2, has its upper portion cut away to clear the shelf hanger 16, its lower portion being cleared by the offset 47 in said hanger, and extending out far enough to engage the first can, or pair of cans, upon the shelf. The last plate at the right hand end, a portion of which appears at 44″ in Figure 2, is similarly cut away at its lower portion to clear the hanger 17, its upper portion shifting the can to the latter's final position at the right-hand end of said shelf.

Figure 7:
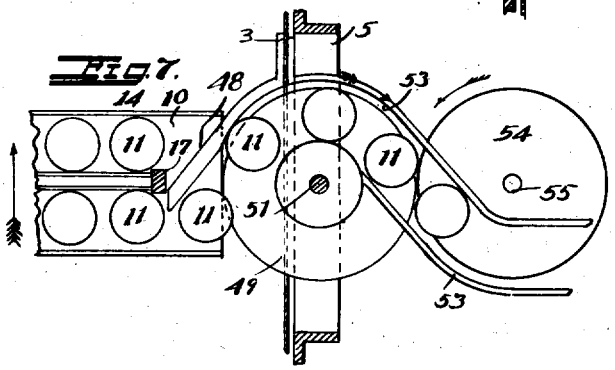
Figure 7 is a detailed plan view of the can discharge mechanism.

The cans are removed from the right-hand end of the shelves 10, as said shelves pass their lowermost positions, by a stationary stripper 48, Figures 2 and 7, which transfers them to a rotating disk 49. The shelf hanger 17 is offset, as shown at 50, in Figure 2, to clear the end of said stripper. The disk 49, which is positioned in the plane of the shelf 10 when the latter is at its lowest position, is secured upon a vertical shaft 51 journaled in the end supporting leg 5, and driven by bevel gears 52 from the shaft 6. Said disk 49 carries the cans out of the shell, between suitably disposed guides 53, Figure 7, and delivers them to a second rotating disk 54 from which they may be removed by any means not shown in the drawings. This second disk is mounted upon a short vertical shaft 55, Figure 2, and is driven by spur gears 56 from the shaft 51.

Figure 8:
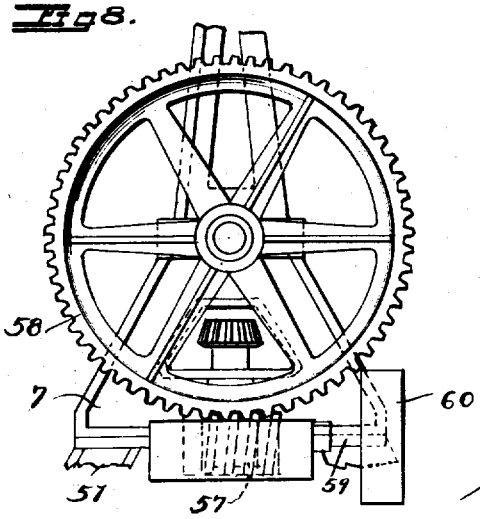
Figure 8 is an end elevation, enlarged, of the driving mechanism.

The entire machine is driven by a worm 57 and worm-wheel 58, Figures 2 and 8, the latter secured upon one end of the shaft 6. Power may be applied to the worm shaft 59 in any desired manner, a pulley 60 being shown in the drawings for this purpose.

It will be readily seen that there is a continuous procession of cans passing through the machine, one can being discharged by the disks 49 and 54 for each can fed into the shell by the disks 29 and 32. The can tracks, of which there are two on each shelf 10, pass the feed and discharge disks 29 and 49 at regular intervals, and at each such passage, a fresh can is placed upon the feed end of each track and an exhausted can is removed from the discharge end thereof. Then, as the shelves 10 pass beneath the can shifting plates 44, the entire series of cans upon each track of said shelves is shifted, toward the discharge end thereof, by a distance equal to or slightly greater than the diameter of one can, thereby making room at the feed end of the track for a fresh can, and shifting the last can of the series to a position from which it is removed by the discharge mechanism. The shelves 10 are at all times horizontal, and describe an approximately circular path within the shell, except at their lowermost and uppermost positions, when they are compelled by the guide rails 24, 25, and 26 to travel horizontally, and are held against swinging by said guide rails, in order to insure the proper movement of the cans thereupon.

The interior of the shell 1 may be heated in any suitable manner, as for example, by means of a steam pipe indicated at 61 in Figures 1 and 3. Drain apertures 62, Figure 2 are provided in the bottom of said shell to permit the escape of condensed moisture.

The box-like shelf structures, as before stated, are open at both ends, to permit free circulation of the heating fluid, so that the cans will be evenly heated. The lower members 13 of said shelf structures are provided with drain apertures 63, to allow the escape of any moisture that may condense therein, and said apertures are so positioned that the drip therefrom will fall between, rather than into, the cans upon the shelf next below.

I claim:—

1. An exhaust-box comprising a heating-shell; a carrier mounted in the shell for rotation about a horizontal axis; a can-shelf pendulously suspended from said carrier; means for imparting continuous rotation to said carrier; means operating through the shell wall timed to feed a can to the moving shelf; and means operating through said shell wall timed to remove the can from the moving shelf.

2. An exhaust-box comprising a heating shell; a carrier mounted in the shell for rotation about a horizontal axis; a can shelf pendulously suspended from said carrier; means for imparting continuous rotation to said carrier; means operating through the shell-wall timed to feed a can to one end of the moving shelf; means within the shell to move said can along the length of the moving shelf to its other end; and means operating through the shell wall timed to remove the can from said last named end of the moving shelf.

3. An exhaust-box comprising a heating shell; a carrier mounted in the shell for rotation about a horizontal axis; a can shelf pendulously suspended from said carrier; means operating through the shell wall to feed a can to said shelf; means operating through said shell wall to remove the can from the shelf; and means within the shell to positively hold the shelf level when passing the can feeding and removing means.

4. An exhaust-box comprising a heating shell; a carrier mounted in the shell for rotation about a horizontal axis; a can shelf pendulously suspended from said carrier; means operating through the shell wall to feed a can to one end of said shelf; means within the shell to move said can along the length of the shelf to its other end; means within the shell to positively hold the shelf level while the can is being moved along it; and means operating through the shell wall to remove the can from said last named end of the shelf.

5. An exhaust-box comprising a heating shell, a carrier mounted in the shell for rotation about a horizontal axis; a can shelf pendulously suspended from said carrier; means operating through the shell wall to feed a can to one end of said shelf; means within the shell to move said can along the length of the shelf to its other end; means within the shell to positively hold the shelf level while the can is being moved along it; means operating through the shell wall to remove the can from said last named end of the shelf; and means within the shell to positively hold the shelf level, when passing the can feeding and removing means.

6. An exhaust-box comprising a heating shell: a carrier mounted in the shell for rotation about a horizontal axis; a can shelf pendulously suspended from said carrier by a pivotal connection having also a free radial play; means operating through the shell wall to feed a can to said shelf; means operating through said shell wall to remove a can from the shelf; a fixed rail within the shell; and controlling members associated with the pendulous connection of the shelf, adapted to engage said rail to positively hold the shelf level when passing the can feeding and removing means.

7. An exhaust-box comprising a heating-shell; a carrier mounted in the shell for rotation about a horizontal axis; a can-shelf pendulously suspended from said carrier by a pivotal connection having also a free radial play; means operating through the shell wall to feed a can to one end of the shelf; a fixed angularly directed member within the shell adapted to move the can along the shelf toward its other end; and means operating through the shell wall to remove the can from said last named end.

8. An exhaust-box comprising a heating-shell, a carrier mounted in the shell for rotation about a horizontal axis; a can shelf pendulously suspended from said carrier by a pivotal connection having also a free radial play; means operating through the shell wall to feed a can to one end of the shelf; a fixed angularly directed member within the shell adapted to move the can along the shelf toward its other end; means operating through the shell wall to remove the can from said last named end; a fixed rail within the shell; and controlling members associated with the pendulous connection of the shelf adapted to engage said rail to positively hold the shelf level while the can is being moved along it by said angularly directed member.

9. An exhaust-box comprising a heating-shell; a carrier mounted in the shell for rotation about a horizontal axis; a can-shelf pendulously suspended from said carrier by a pivotal connection having also a free radial play; means operating through the shell wall to feed a can to one end of the shelf; a fixed angularly directed member within the shell adapted to move the can along the shelf towards its other end; means operating through the shell wall to remove the can from said last named end; a fixed rail within the shell; controlling members associated with the pendulous connection of the shelf adapted to engage said rail to positively hold the shelf level while the can is being moved along it by said angularly directed member; and another fixed rail within the shell with which said controlling members of the pendulous shelf connection are adapted to engage to positively hold the shelf level when passing the can feeding and removing means.

10. An exhaust-box comprising a heating-shell; a carrier mounted therein for rotation about a horizontal axis; a can-shelf pendulously suspended from said carrier; means for imparting continuous rotation to said carrier; a train of rotating disks and associated strippers operating through one end of the shell and timed to feed a can to the moving shelf; and a train of rotating disks and associated strippers operating through the other end of the shell and timed to remove the can from the moving shelf.

11. An exhaust-box comprising a heating-shell; a carrier mounted therein for rotation about a horizontal axis; a can-shelf pendulously suspended from said carrier; a train of rotating disks and associated strippers operating through one end of the shell to feed a can to said shelf, a train of rotating disks and associated strippers operating through the other end of the shell to remove the can from the shelf; and means within the shell to positively hold the shelf level, when passing the can feeding and removing disk trains.

12. An exhaust-box comprising a heating-shell; a carrier mounted therein for rotation about a horizontal axis; a can-shelf pendulously suspended from said carrier; means for imparting continuous rotation to said carrier; a train of rotating disks and associated strippers operating through one end of the shell and timed to feed a can to one end of the moving shelf; fixed angularly directed spaced plates within the upper portion of the shell to move the can towards the other end of the shelf; and a train of rotating disks and associated strippers operating through the other end of the shell and timed to remove the can from the moving shelf.

13. An exhaust-box comprising a heating-shell; a carrier mounted therein for rotation about a horizontal axis; a can-shelf pendulously suspended from said carrier; a train of rotating disks and associated strippers operating through one end of the shell to feed a can to one end of the shelf; a fixed angularly directed member within the upper portion of the shell to move the can towards the other end of the shelf; a train of rotating disks and associated strippers operating through the other end of the shell to remove the can from the shelf; means within the shell to positively hold the shelf level while the can is being moved thereon by the angularly directed member; and other means within the shell to positively hold the shelf level, when said shelf is passing the can feeding and removing disk trains.

14. An exhaust-box comprising a heating shell; a carrier mounted in the shell for rotation about a horizontal axis; a can shelf pendulously suspended from said carrier; means operating through the shell wall to feed a can to one end of the shelf; fixed, angularly directed spaced plates within the shell adapted to move the can along the shelf towards its other end; and means operating through the shell wall to remove the can from said named end.

15. An exhaust-box comprising a heating-shell; a carrier mounted in the shell for rotation about a horizontal axis; a can-shelf pendulously suspended from said carrier; means operating through the lower portion of one end of the shell wall to feed a can to one end of the shelf when said shelf is at its lowermost position; and means operating through the lower portion of the other end of the shell wall to remove the can from the other end of said shelf when said shelf is at its lowermost position.

16. An exhaust-box comprising a heating shell; a carrier mounted in the shell for rotation about a horizontal axis; a can-shelf pendulously suspended from said carrier; means operating through the lower portion of one end of the shell wall to feed a can to one end of the shelf when said shelf is at its lowermost position; means within the shell to move the can along the length of the shelf to its other end; and means operating through the lower portion of the other end of the shell wall to remove the can from said other end of the shelf when said shelf is at its lowermost position.

17. An exhaust-box comprising a heating-shell; a carrier mounted in the shell for rotation about a horizontal axis; a can shelf pendulously supported by the carrier; means operating during the lower portion of movement of the can carrier to feed a can to one end of the shelf; and means at the other end of the shell to remove the can from the shelf during the time said shelf is traveling in its lower position.

18. An exhaust-box comprising a heating-shell; a carrier mounted in the shell for rotation about a horizontal axis; a can shelf pendulously supported by said carrier; means operating to feed a can to one end of the shelf during a portion of its lower movement; means within the shell to move the can along the shelf; and means to remove the can from the other end of the shelf during a portion of its lower movement.

19. An exhaust-box comprising a heating shell; a carrier mounted therein; a can shelf pendulously supported upon said carrier; means to feed cans to the carrier at one end thereof; means to remove the can from the other end of the carrier; said longitudinal can movements taking place near the bottom of the carrier movement, and means within the shell to move the cans along the carrier.

20. An exhaust-box comprising a heating-shell; a carrier therein; a can shelf pendulously supported by the carrier; means to feed cans to one end of the shelf through the shell wall; means near the top of the shell to move the cans along said shelf; and means to remove the cans from the shelf and shell at the other end of the shelf.

21. An exhaust-box comprising a heating-shell; having openings there-into in its lower portion; a carrier revolubly mounted in the shell; a plurality of can shelves pendulously supported by the carrier; means operating when the shelf is in its lower position to feed cans thereto; means to move the cans along the length of each of said shelves; and means to remove a can from the other end of the shelf.

22. An exhaust-box comprising a heating-shell; a revoluble carrier mounted therein; a series of can shelves pendulously supported by the carrier; means to steady the can shelves during a period of the time the shelf is below the carrier; means to remove a can from one end of the carrier; and means to feed a can to the carrier at the other end thereof when engaged with said steadying means.

23. An exhaust-box comprising a heating-shell; a revoluble carrier mounted therein; a series of can shelves pendulously supported by the carrier; means to steady the shelf to prevent it from swinging during a period of the time the shelf is below the carrier; means to feed cans to the carrier at one end thereof; and means to remove a can from the other end of the carrier.

24. An exhaust-box comprising a heating shell; a revoluble carrier therein; a can shelf pendulously supported by the carrier; means to steady the can shelf during a portion of the time the shelf is below the carrier; means to move a series of cans along said shelf; means to feed cans thereto; and means to remove cans therefrom during a portion of the time the carrier is moving along the steadying support.

25. An exhaust-box comprising a rotary carrier, shelves carried thereby adapted to ride in a horizontal plane; means for feeding cans to the shelves in a period of time when they are below the carrier; and means for steadying the shelves during the feeding of the cans.

26. An exhaust-box comprising a heating shell, a carrier mounted in the shell for rotation about a horizontal axis; a can shelf pendulously supported by the carrier; means operating when the shelf is below the carrier to feed a can to one end of the shelf; and means to remove the cans from the other end of said shelf.

27. An exhaust-box comprising a heating shell, a horizontal rotary carrier; pendulously supported shelves mounted on said carrier; and means for feeding to and discharging cans from said shelves when said shelves are in a position below the carrier.

28. An exhaust-box comprising a series of shelves; adapted to be carried around a horizontal axis; means for maintaining the shelves in a horizontal plane with respect to said axis, and means for feeding cans to and discharging them from the shelves when they are below the carrier.

In testimony whereof I have hereunto set my hand this 21st day of June, 1926.

ALBERT R. THOMPSON.